D. H. MOSTELLER.
ICE CREAM SPOON.
APPLICATION FILED APR. 13, 1909.
951,571. Patented Mar. 8, 1910.
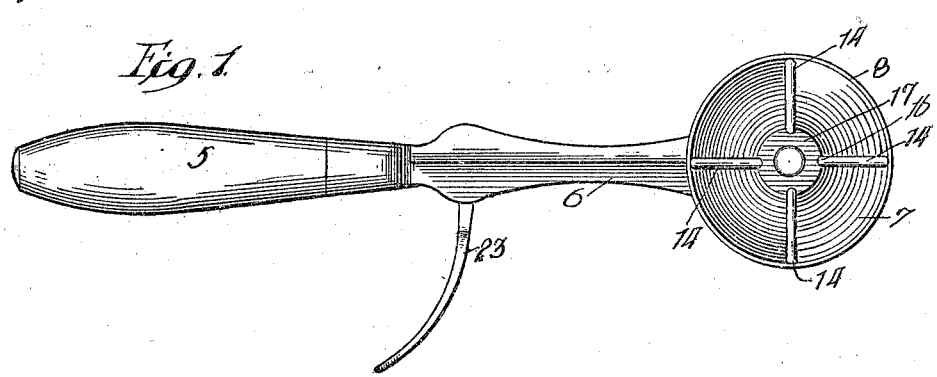
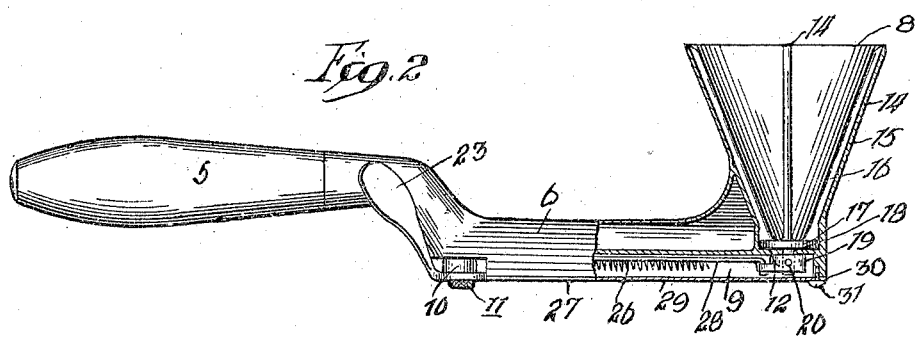
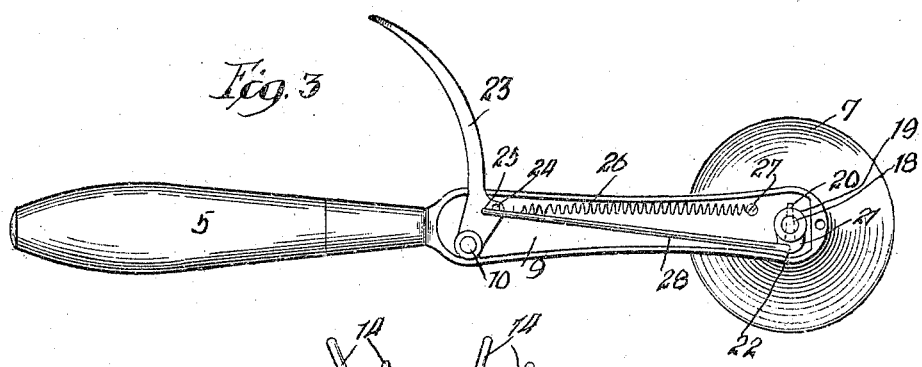
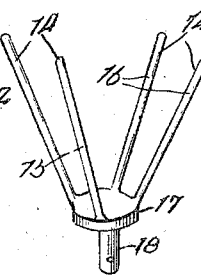
Witnesses:
Inventor:
Dosier H Mosteller

UNITED STATES PATENT OFFICE.

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

ICE-CREAM SPOON.

951,571.   Specification of Letters Patent.   Patented Mar. 8, 1910.

Application filed April 13, 1909. Serial No. 489,664.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Spoons, of which the following is a specification.

The present invention relates to an improved ice cream spoon, and has for its essential object to provide a comparatively simple, efficient and durable construction which is attractive and handsome in appearance, all of the mechanisms being completely housed within its body so that when the spoon is in constant use and service the ice cream will not come in contact with the mechanism.

The invention consists in the features of construction and combination of parts hereinafter described and claimed.

In the drawings Figure 1 is a top view looking down upon the device; Fig. 2 a side elevation thereof, a part of the spoon being in section; Fig. 3 an under view of the device, the cap or cover therefor having been removed; and Fig. 4 a perspective of the movable scrapers employed therein.

This improved ice cream spoon has a handle 5 attached to its body 6, which is usually made of aluminum or other material that is light and attractive, the spoon body merging at its forward end into a cup 7 having an enlarged annular orifice 8. The spoon body 6 is provided with an elongated channel body 9 having a pivot post 10 near its upper end, which is threaded for engaging an adjustable nut 11. In the lower end of this protected body 9 is an annular opening 12 formed centrally with respect to the base of the cup 7.

Referring to Fig. 4, the movable scraper blades 14 comprise a plurality of outwardly diverging prongs having flat under faces 15 and rounded outer faces 16, said prongs merging together at their lower ends into an annular plate 17 having a downwardly projecting stem 18 through the lower end of which is drilled an opening. When the stem 18 is inserted into the central opening 12 a retaining collar 19 is inserted over its lower end, said collar having a corresponding opening drilled therethrough so that when the openings in the stem 18 and collar 19 are brought into register a locking pin 20 will retain the parts in proper operative position. Upon the periphery of this collar 19 is formed a lug 21 having a hole 22 drilled therethrough. A trigger 23 has its inner end pivotally mounted upon the post 10 and has, as shown, two openings 24 and 25 respectively. The opening 24 is adapted to receive the upper end of a coil spring 26, its lower end being fastened about a lug or screw 27 secured to the bottom of the spoon body, the tension of the spring normally keeping the trigger in advanced forward position. A connecting bar or link 28 has its hooked ends in engagement both with the opening 25 in the trigger 23 and with the opening 22 in the lug of the collar 19, so that when the trigger is pulled backward the scraper plates within the cup 7 will be actuated. An elongated cover 29 is seated upon the back of the spoon body, the cover having an opening at its upper end to engage the pivot post 10 upon which the adjustable nut 11 is screwed for locking the same in place, the lower front edge 30 of the cover being maintained in fixed position by engaging the under side of a screw or lug 31, as illustrated in Fig. 2.

From the foregoing description it will be seen that the various parts comprising this mechanism are extremely simple in construction and easy to replace when worn out or broken, and that the elongated cover 29 serves to effectually house and conceal the mechanism within the spoon body, so that its utility will not become impaired by coming in contact with the ice cream as it is dished out.

What I claim as new and desire to secure by Letters Patent is:

1. An ice cream spoon having a protected body for concealing its mechanism, the cup of the spoon having a plurality of movable scraper plates contacting its inner side walls said scrapers merging together at their lower ends within the bottom of the cup, and means for operating the mechanism to actuate the movable scraper plates, substantially as described.

2. In an ice cream spoon, a recessed spoon body for housing the mechanism, a pivot at the upper end of the body upon which a trigger is mounted, a cup on the outer end of the spoon body, movable scrapers within the cup, said scrapers merging together at their lower ends within the bottom of the cup and mechanism housed within the spoon body and connected with the trigger so that movement of the trigger will actuate the scrapers within the cup, substantially as described.

3. In an ice cream spoon, a recessed body having a cup at its forward end, movable scrapers within the cup, said scrapers merging together at their lower ends within the bottom of the cup, mechanism for actuating the scrapers within the recessed spoon body, a cover for protecting the mechanism within the spoon body and a trigger for actuating the scrapers, substantially as described.

4. In an ice cream spoon, an elongated recessed spoon body merging at its forward end into a cup, movable scrapers within the cup, the scrapers having a stem inserted centrally through the bottom of the cup, a collar engaging the stem of the scraper, a trigger pivoted at the upper end of the recessed body, a spring having one of its ends attached to the trigger and its other end secured within the spoon body, and a bar connecting the trigger and collar so that when the trigger is moved the scrapers will be actuated, substantially as described.

5. In an ice cream spoon, a recessed spoon body merging at its forward end into a cup, a movable scraper within the cup comprising outwardly diverging prongs united at their lower ends in a plate having a downwardly projecting stem inserted through an opening in the bottom of the cup, a collar locked to the end of the stem and having a lug formed thereon, a pivotally mounted trigger at the upper end of the recessed body, a spring having one of its ends connected to the trigger and its other end secured within the recessed body, and a link connected to the trigger and the lug of the collar so that when the trigger is moved the scrapers will be actuated within the cup, substantially as described.

6. In an ice cream spoon, a recessed spoon body merging at its forward end into a cup, a movable scraper within the cup comprising outwardly diverging prongs united at their lower ends in a plate having a downwardly projecting stem inserted through an opening in the bottom of the cup, a collar locked to the end of the stem and having a lug formed thereon, a pivotally mounted trigger at the upper end of the recessed body, a spring having one of its ends connected to the trigger and its other end secured within the recessed body, a link connected to the trigger and the lug of the collar so that when the trigger is moved the scrapers will be actuated within the cup, and a cover for protecting the spoon mechanism, the outer edge of the cover being maintained in place beneath a lug at the front of the spoon and the inner end by engaging a pivot post to which it is locked by an adjustable nut, substantially as described.

DOSIER H. MOSTELLER.

Witnesses:
WALKER BANNING,
PAULINE BECKMAN.